(12) United States Patent    (10) Patent No.: US 7,722,486 B2
Nanko                        (45) Date of Patent: May 25, 2010

(54) TOP/BOTTOM PULL BICYCLE FRONT DERAILLEUR

(75) Inventor: Yoshiaki Nanko, Sakai (JP)

(73) Assignee: Shimano Inc., Osaka (JP)

( * ) Notice: Subject to any disclaimer, the term of this patent is extended or adjusted under 35 U.S.C. 154(b) by 759 days.

(21) Appl. No.: 11/302,158

(22) Filed: Dec. 14, 2005

(65) Prior Publication Data

US 2007/0135249 A1    Jun. 14, 2007

(51) Int. Cl.
*F16H 59/00* (2006.01)
*F16H 9/00* (2006.01)

(52) U.S. Cl. .............. 474/80; 474/78; 474/79; 474/81; 474/82; 474/103

(58) Field of Classification Search ............... 474/80, 474/78, 79, 140; D12/111
See application file for complete search history.

(56) References Cited

U.S. PATENT DOCUMENTS

| | | | |
|---|---|---|---|
| 4,030,374 A | 6/1977 | Isobe | |
| 4,194,409 A | 3/1980 | Nagano | |
| 4,279,172 A * | 7/1981 | Nagano et al. | 474/82 |
| 4,674,995 A | 6/1987 | Iwasaki | |
| 4,756,704 A | 7/1988 | Nagano | |
| 5,104,358 A * | 4/1992 | Kobayashi | 474/82 |
| 5,312,301 A | 5/1994 | Kobayashi | |
| 5,496,222 A * | 3/1996 | Kojima et al. | 474/80 |
| 5,540,118 A * | 7/1996 | Calendrille, Jr. | 74/608 |
| 5,816,966 A | 10/1998 | Yang et al. | |
| 6,099,425 A | 8/2000 | Kondo | |
| 6,234,927 B1 | 5/2001 | Peng | |
| 6,471,610 B1 * | 10/2002 | Tseng et al. | 474/80 |
| 6,482,115 B2 | 11/2002 | Takachi | |
| 6,623,389 B1 | 9/2003 | Campagnolo | |
| 6,902,503 B2 | 6/2005 | Nanko | |
| 2002/0034996 A1 | 3/2002 | Valle | |
| 2004/0127314 A1* | 7/2004 | Nanko et al. | 474/80 |
| 2004/0185975 A1* | 9/2004 | Chen | 474/80 |

* cited by examiner

*Primary Examiner*—Robert A Siconolfi
*Assistant Examiner*—San Aung
(74) *Attorney, Agent, or Firm*—Global IP Counselors, LLP

(57) ABSTRACT

A top/bottom pull front derailleur includes a base member, inner and outer links, a chain guide and a top/low adjustment mechanism coupled to the base member. The links are pivotally coupled between the base member and the chain guide. The inner link has a wire fixing part that can be used in top and bottom pull arrangements. The chain guide is configured to move between a retracted position and an extended position relative to the base member. The adjustment mechanism includes top and low adjusting bolts with longitudinal bolt axes angled more than zero degrees relative to a plane of the bicycle frame. The adjustment mechanism is mounted rearwardly of single attachment portion of the outer link or between a pair of attachment portions of the outer link. The bolt axes are preferably angled about 45 degrees or about 90 degrees relative to the plane of the frame.

22 Claims, 14 Drawing Sheets

TOP/BOTTOM PULL BICYCLE FRONT DERAILLEUR

BACKGROUND OF THE INVENTION

1. Field of the Invention

The present invention generally relates to a top/bottom pull bicycle front derailleur. More specifically, the present invention relates to a top/bottom pull bicycle front derailleur with a swing adjustment mechanism that adjusts the top and low positions of a chain guide of the front derailleur with respect to the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle front derailleur.

Generally speaking, the front derailleur is typically secured to the seat tube of the bicycle frame or the bottom bracket. Basically, a front derailleur includes a base (fixed) member non-movably secured to the bicycle frame, a movable member supported to be movable relative to the base member and a chain guide. Typically, the base member is a tubular clamping member that is secured to the seat tube. The movable member typically is formed of a pair of pivotal links that form a four-bar linkage with the base member and the chain guide. The chain guide typically has chain cage with a pair of cage plates for contacting and moving a chain between front sprockets of a bicycle drive train. The chain guide is usually biased in a given direction relative to the base member by a spring. The chain guide is usually moved laterally relative to the base member by pulling and/or releasing a shifter control cable that is coupled between a shifter and the front derailleur. The control cable is often connected to one of the pivotal links to apply a torque thereto in order to move the chain guide between an extended position and a retracted position.

More recently, front derailleurs have been developed that use other types of arrangements for the movable member, e.g. an electric motor arrangement, a hydraulic arrangement, etc. Also, more recently, due to the many types of frames for bicycles (e.g. due to the various dual suspension designs as well as "hard tail" designs with various frame geometries and cable routing structures), cable operated front derailleurs have been provided that can be used as top pull or bottom pull front derailleurs. With such derailleurs, a top/low adjustment mechanism is typically mounted on the chain guide (movable member). With traditional single pulling direction derailleurs, a top/low adjustment mechanism is also typically mounted to the derailleur. However, with these single pulling direction derailleurs, the adjusting mechanism can be mounted to the chain guide (movable member), but can also be mounted to the linkage assembly or the base member. In any case, with the typical front derailleurs, it can be difficult to adjust the adjusting mechanism, especially when mounted on certain frames. With some mounting arrangements, a special tool or tools may be required. Also, with these typical derailleurs, while they generally work well, it is possible that some derailleurs might not be useable on certain bicycles due to the frame type, etc.

In view of the above, it will be apparent to those skilled in the art from this disclosure that there exists a need for an improved top/bottom pull bicycle front derailleur. This invention addresses this need in the art as well as other needs, which will become apparent to those skilled in the art from this disclosure.

SUMMARY OF THE INVENTION

One object of the present invention is to provide a bicycle front derailleur that can be operated using a top pull cable arrangement or a bottom pull cable arrangement (i.e. a top/bottom pull bicycle front derailleur).

Another object of the present invention is to provide a top/bottom pull bicycle front derailleur with a top/bottom adjustment mechanism that is relatively easily accessed/adjusted even when mounted on a wide variety of bicycle constructions (e.g. rear suspension styles, frame geometries and/or cable routing arrangements) without the need for a special tool.

Yet another object of the present invention is to provide a top/bottom pull bicycle front derailleur with a top/bottom adjustment mechanism that is relatively simple and inexpensive to manufacture and assemble.

The foregoing objects can basically be achieved by providing a top/bottom pull bicycle front derailleur that basically includes a base member, an inner link, an outer link, a chain guide and a top/low adjustment mechanism. The base member is configured to be coupled to a portion of a bicycle frame. The inner link has a first end, a second end and an inner wire fixing part. The first end is pivotally coupled to the base member about a first inner link axis, and the inner wire fixing part is configured and arranged to guide an inner wire to be selectively guided in one of a top pull arrangement and a bottom pull arrangement. The outer link has a first end and a second end with the first end of the outer link being pivotally coupled to the base member about a first outer link axis. The chain guide is pivotally coupled to the second end of the inner link about a second inner link axis and pivotally coupled to the second end of the outer link about a second outer link axis such that the chain guide is configured to move between a retracted position and an extended position relative to the base member. The top/low adjustment mechanism is coupled to the base member. The top/low adjustment mechanism includes a top position adjusting bolt and a low position adjusting bolt. The top position adjusting bolt has a top longitudinal bolt axis arranged at an angle greater than zero degrees with respect to a plane of the bicycle frame and is configured to selectively contact the inner link to selectively adjust the extended position of the chain guide with respect to the base member. The low position adjusting bolt has a low longitudinal bolt axis arranged at an angle greater than zero degrees with respect to the plane of the bicycle frame and is configured to selectively contact the inner link to selectively adjust the retracted position of the chain guide with respect to the base member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
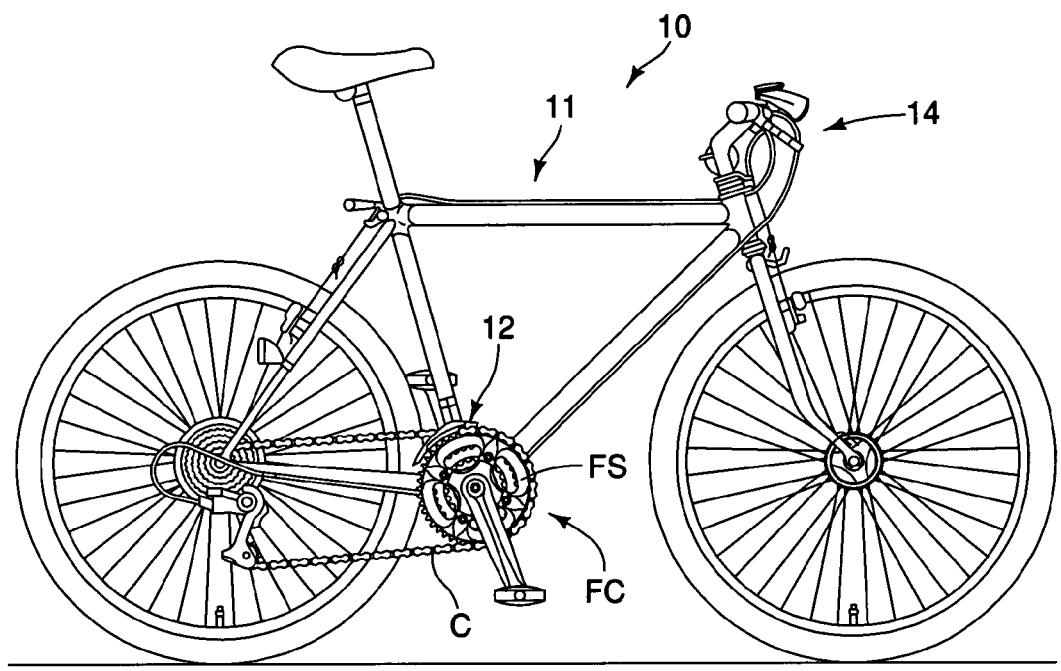
FIG. 1 is a right side elevational view of a bicycle with a top/bottom pull front derailleur in accordance with the present invention.
Figure 2:
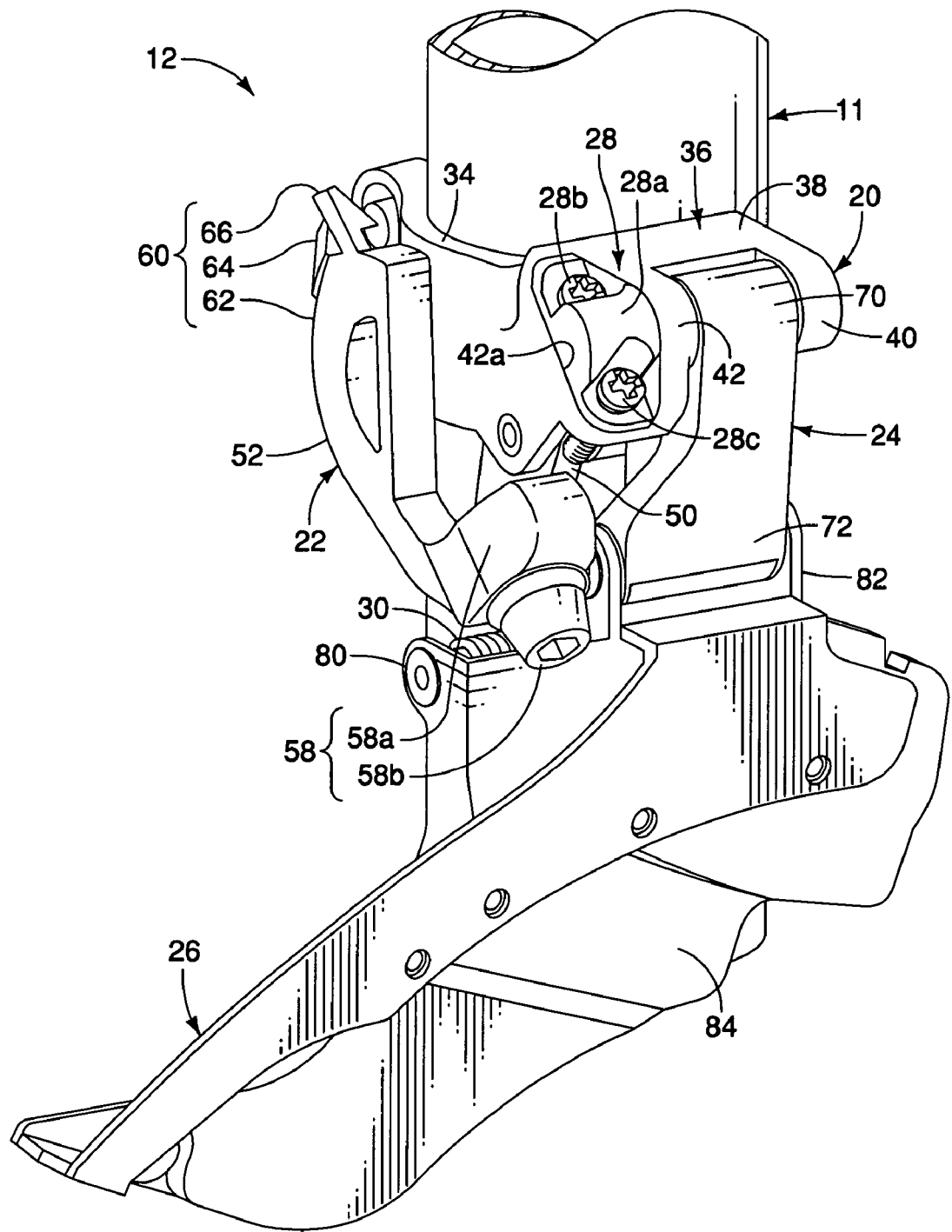
FIG. 2 is an enlarged perspective view of the top/bottom pull front derailleur illustrated in FIG. 1 in accordance with the first embodiment of the present invention.

Referring initially to FIG. 1, a bicycle 10 is illustrated having a bicycle frame 11 that is equipped with a top/bottom pull bicycle front derailleur 12 in accordance with a first embodiment of the present invention. As explained below in more detail, the bicycle front derailleur 12 is configured and arranged to be operated in a top pull arrangement or a bottom pull arrangement to move between a retracted position and an extended position relative to the bicycle frame 11 to shift a chain C laterally between a plurality of front sprockets FS that are fixedly attached to a front crank FC. The front derailleur 12 is further configured and arranged to have the top and low (extended and retracted) positions adjusted in convenient manner. A conventional bicycle shift control device 14 is operatively coupled to the front derailleur 12 via a conventional shift control cable 16 to control movement of the front derailleur 12.

The bicycle 10 is also equipped with other conventional drive train components as well as other conventional bicycle components, as seen in FIG. 1. Since the parts of bicycle 10 are generally well known in the art, the parts of the bicycle 10 will not be discussed and/or illustrated in detail herein. Moreover, other conventional bicycle parts, which are not illustrated and/or discussed herein, can also be used in conjunction with the present invention. In other words, the various parts of the bicycle 10 will not be discussed and/or illustrated in detail herein, except as needed to make and use the front derailleur 12 of the present invention.

Referring now to FIGS. 1-5, the bicycle front derailleur 12 basically includes a base member 20, an inner link 22, an outer link 24, a chain guide 26, a top/low adjustment mechanism 28 and a biasing member or spring 30. The top/low adjustment mechanism 28 is coupled to the base member 20 and is configured and arranged to be angled relative to a longitudinal center plane P of the bicycle frame 11 in accordance with the present invention, as explained below. The top/low adjustment mechanism 28 is configured and arranged to selectively contact the inner link 22 to control the range of movement of the chain guide 26 in accordance with the present invention, as also explained below.

The base member 20 is fixedly attached to the seat tube of the bicycle frame 11. The inner and outer links 22 and 24 are pivotally coupled to the base member 20 and the chain guide 26 such that the base member 20, the inner link 22, the outer link 24 and the chain guide 26 together form a four bar linkage. The chain guide 26 is usually biased in a predetermined direction (i.e. toward the center plane P) relative to the base member 20 by the biasing member 30 in a conventional manner. In the illustrated embodiment, the biasing member 30 is coiled torsion spring with one end engaged with the inner link 22 and the other end engaged with the chain guide 26 in a conventional manner. The front derailleur 12 is configured and arranged to be operated by the shift control cable 16 in response operation of the shift control device 14. The control cable 16 is coupled to the inner link 22 of the front derailleur 12 in accordance with the present invention.

When the shift control device 14 is operated to pull the shift control cable 16, a torque is applied to the inner link 22 in order to move the chain guide 26 from the retracted position (FIG. 4) to the extended position (FIG. 5) relative to the base member 20. On the other hand, when the shift control device 14 is operated to release the shift control cable 16, the inner link 22 rotates under the biasing force of the biasing member 30 such that the chain guide 26 moves from the extended position (FIG. 5) to the retracted position (FIG. 4) relative to the base member 20. In other words, the chain guide 26 is moved relative to the base member 20 by pulling and/or releasing the shift control cable 16 that is operatively coupled between the shift control device 14 and the front derailleur 12.

While only two shift positions (i.e. one retracted or low position and one extended or top position) are illustrated herein, it will be apparent to those skilled in the art from this disclosure that the front derailleur 12 moves between three positions when three front sprockets FS are provided (as illustrated in FIG. 1), or between two shift positions if only two front sprockets FS are provided. In other words, the chain guide 26 also is movable to an intermediate position (not shown) when three front sprockets FS are provided as illustrated in FIG. 1. The intermediate position is located between the retracted and extended positions of FIGS. 4 and 5. Of course, depending on the spacing and number of front sprockets FS as well as the type of chain C, the precise locations of the top, low and intermediate (if present) will vary as is well known in the bicycle art.

Referring still to FIGS. 1-5, the base member 20 basically includes a first clamping portion 32, a second clamping portion 34 and a derailleur mounting portion 36. The clamping portions 32 and 34 are arranged in a conventional manner for attachment to the seat tube of the frame 11. Specifically, the clamping portions 32 and 34 are curved C-shaped members with one end of each pivotally coupled together and opposite ends connected together by an attachment bolt in order to clamp the clamping members 32 and 34 onto the seat tube of the frame 11 in a conventional manner. The derailleur mounting portion 36 is configured and arranged to pivotally support the inner and outer links 22 and 24. Also, a part of the derailleur mounting portion 36 supports the adjustment mechanism 28. In other words, a part of the derailleur mounting portion 36 forms a non-movable support part of the adjustment mechanism 28.

The derailleur mounting portion 36 is non-movably fixed to the second clamping portion 34. Preferably, the derailleur mounting portion 36 and the second clamping portion 34 are integrally formed together as a one-piece, unitary member. In any case, the first clamping portion 32, the second clamping portion 34 and the derailleur mounting portion 36 are each preferably constructed of a lightweight, rigid material such as aluminum alloy or any other material that is well known in the bicycle art.

The derailleur mounting portion 36 basically includes a main body 38, a front mounting flange 40, a rear mounting flange 42 and an inner link receiving recess 44. The main body 38 extends from the second clamping portion 34. The front and rear mounting flanges 40 and 42 extend in a parallel arrangement from the main body 38. The inner link receiving recess 44 extends into the rear mounting flange 42 and into the main body 38. The inner link 22 is pivotally mounted within the inner link receiving recess 44 for rotation about a first inner link axis A. The outer link 24 is pivotally coupled between the front and rear mounting flanges 40 and 42 for rotation about a first outer link axis B that is parallel to the first inner link axis A. The derailleur mounting portion 36 is formed with apertures (only partially shown) that receive generally parallel first inner and outer pivot pins to pivotally support the inner and outer links 22 and 24 in a conventional manner. The rear mounting flange 42 is further configured and arranged to have the top/low adjustment mechanism 28 coupled thereto.

Specifically, the rear mounting flange 42 has an inclined mounting surface 42a with low and top adjustment holes 42b and 42c extending perpendicularly relative thereto for attaching the top/low adjustment mechanism 28. The inclined mounting surface 42a is inclined about one-hundred-thirty-five degrees (or about forty-five degrees, depending on the manner measured) degrees relatively to the center plane P of the frame 11 as viewed along the first inner link axis A. Thus, the low and top adjustment holes 42b and 42c are angled about forty-five degrees (or about one-hundred-thirty-five degrees, depending on the manner measured) relatively to the center plane P of the frame 11 as viewed along the first inner link axis A. The low and top adjustment holes 42b and 42c are threaded through bores that extend between the inclined mounting surface 42a and the inner link receiving recess 44.

The top/low adjustment mechanism 28 basically includes a mounting plate 28a, a low position adjusting bolt 28b and a top position adjusting bolt 28c that finely adjust the low and top positions of the chain guide 26, respectively. Specifically, the low and top position adjusting bolts 28b and 28c are threadedly mounted in the low and top adjustment holes 42b and 42c to project into the inner link receiving recess 44 in order to selectively contact the inner link 22 in the low and top positions to control the low and top positions of the chain guide 26 (i.e. the range of movement of the chain guide 26). In other words, the low adjusting bolt 28b is configured and arranged to change the low shift position of the chain guide 26 relative to the base member 20, while the top adjustment screw 28c is configured and arranged to change the top shift position of the chain guide 26 relative to the base member 20.

The mounting plate 28a is provided with a pair of unthreaded through holes for receiving the low and top position adjusting bolts 28b and 28c therein prior to threading the low and top position adjusting bolts 28b and 28c into the low and top adjustment holes 42b and 42c. The mounting plate 28a forms part of an anti-loosening structure of the adjustment mechanism 28 that is coupled between the base member 20 and the low and top position adjusting bolts 28b and 28c. The anti-loosening structure prevents unintentional rotation of the low and top position adjusting bolts 28b and 28c.

Specifically, the mounting plate 28a is preferably constructed of a plastic material. The unthreaded through holes of the mounting plate 28a are preferably configured to prevent accidental rotation of the low and top adjusting bolts 28b and 28c when mounted therein. The unthreaded through holes of the mounting plate 28a are preferably configured to frictionally engage the low and top adjusting bolts 28b and 28c to normally prevent rotation thereof unless a torque greater than the friction force is applied. In other words, the unthreaded through holes of the mounting plate 28a preferably have a diameter the same or very slightly smaller than the outer thread diameter of the low and top adjusting bolts 28b and 28c to form at least a tight fit therebetween to prevent loosening. Alternatively, the low and top adjusting bolts 28b and 28c can be threaded into the unthreaded through holes that are slightly smaller than the outer thread diameter in a self-tapping manner to prevent loosening.

Due to the arrangement of the threaded low and top adjustment holes 42b and 42c, the low and top adjusting bolts 28b and 28c have low and top longitudinal bolt axes X and Y that are angled about forty-five degrees relatively to the plane P in this embodiment. However, various inclinations are possible. Preferably, the low and top longitudinal bolt axes X and Y are angled sufficiently relative to the center plane P such that a majority of bicycle frames and/or rear suspensions do not interfere with using a screwdriver to rotate the low and top adjusting bolts 28b and 28c. For instance, the low and top longitudinal bolt axes X and Y are preferably angled about twenty-two and one-half degrees or greater relative to the center plane P. More preferably, the low and top longitudinal bolt axes X and Y are angled about forty-five degrees or greater relative to the center plane P. In any case, the low and top longitudinal bolt axes X and Y are angled more than zero degrees (i.e. are not parallel) to the plane P.

Figure 4:
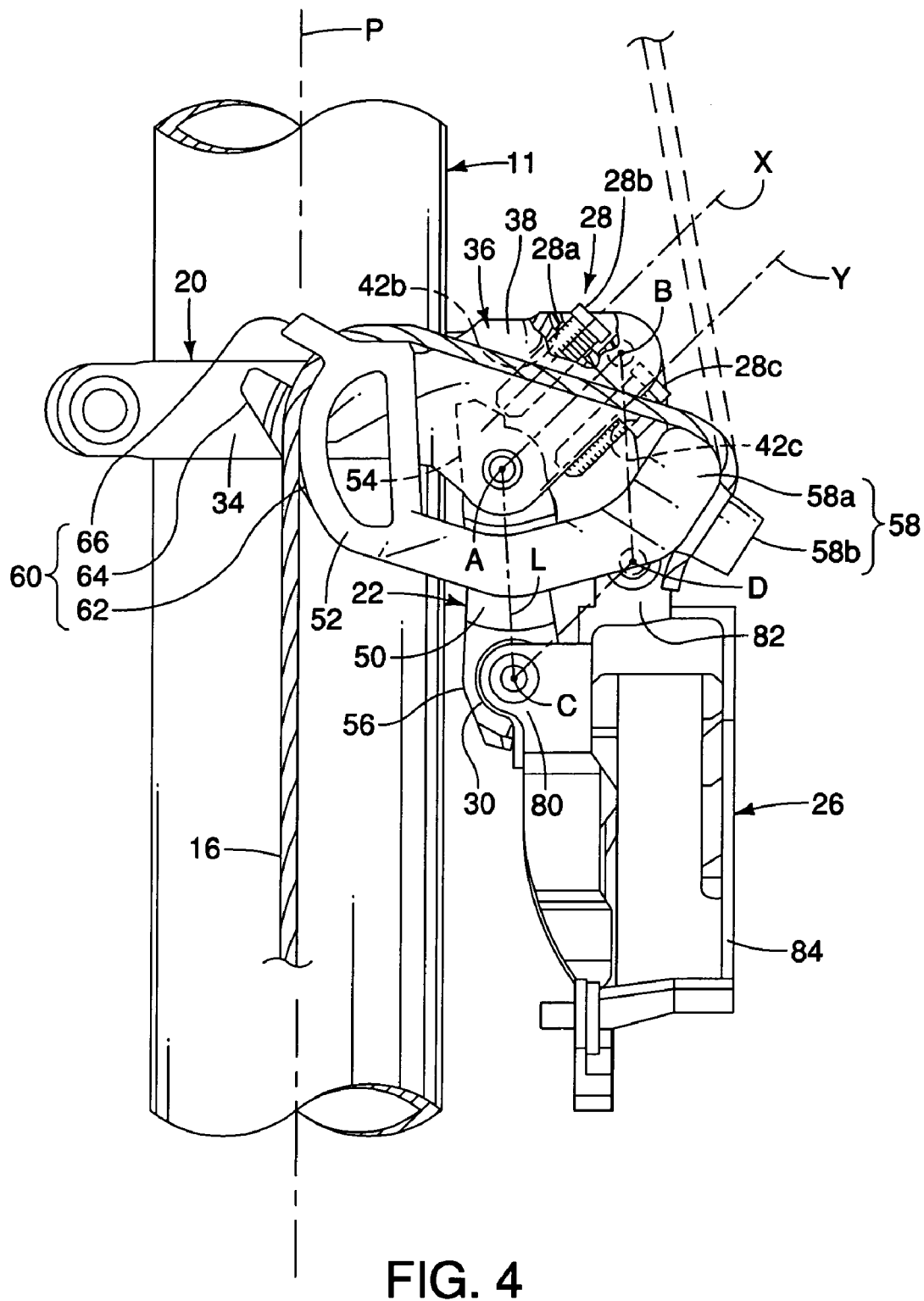
FIG. 4 is a rear side elevational view of the top/bottom pull front derailleur illustrated in FIGS. 1-3 with the chain guide in a low (retracted) shift position in accordance with the first embodiment of the present invention.
Figure 5:
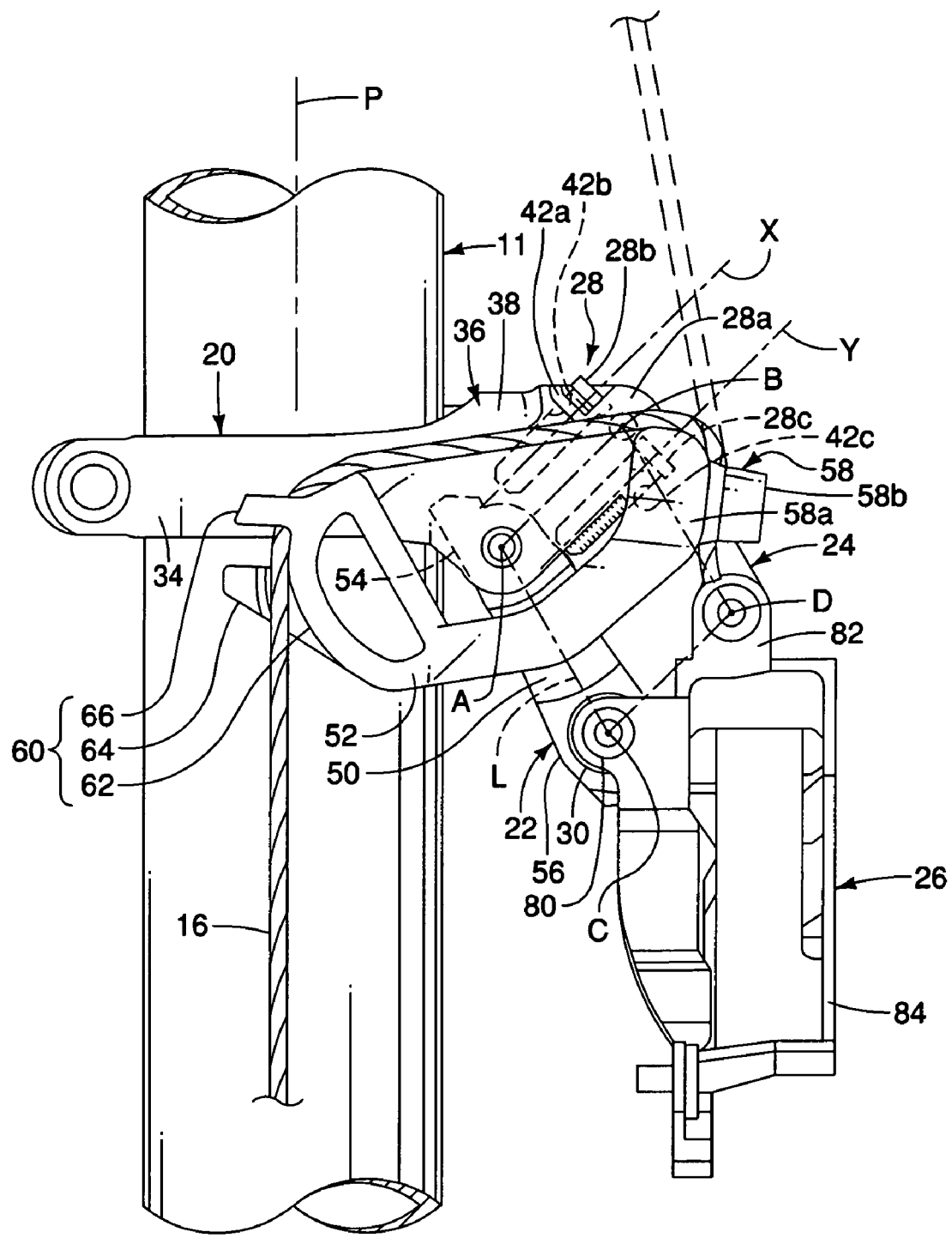
FIG. 5 is a rear side elevational view of the top/bottom pull front derailleur illustrated in FIGS. 1-4 with the chain guide in a top (extended) shift position in accordance with the first embodiment of the present invention.

The top longitudinal bolt axis Y is disposed on a first side of the first outer link axis B and the low longitudinal bolt axis X is disposed on a second (opposite) side of the first outer link axis B. Moreover, the top longitudinal bolt axis Y is preferably disposed on a first side of the first inner link axis A and the low longitudinal bolt axis X is preferably disposed on a second (opposite) side of the first inner link axis A. Preferably, the low and top longitudinal bolt axes X and Y are equally spaced from both the first inner and outer link axis A and B such that the low and top longitudinal bolt axes X and Y are parallel to a plane (line) passing through the first inner and outer link axis A and B, as seen in FIGS. 4 and 5.

Referring still to FIGS. 1-5, the inner link 22 basically includes a linkage part 50 and a wire attachment part 52 non-movably fixed to the linkage part 50 to move therewith. Preferably, the wire attachment part 52 is integrally formed with the linkage part 50 as a one-piece, unitary member. In any case, the linkage part 50 and the wire attachment part 52 are each preferably constructed of a lightweight, rigid material such as aluminum alloy or any other material that is well known in the art. The wire attachment part 52 extends in a transverse direction relative to the linkage part 50.

The linkage part 50 includes a first end 54 and a second end 56. The first end 54 is pivotally coupled to the base member 20 within the inner link receiving recess 44 for rotation about the first inner link axis A. The second end 56 is pivotally coupled to the chain guide 26 for rotation about a second inner link axis C that is parallel to the first inner link axis A. The first end 54 is shaped to cooperate with the adjustment mechanism 28 to limit laterally inward and outward movement of the chain guide 26 in the low and top (retracted and extended) positions, respectively. In particular, the first end 54 has a substantially fan-shaped configuration as best seen in FIGS. 4 and 5 such that the inner link 22 will selectively contact the low and top adjusting bolts 28b and 28c in the top and low shift positions of the chain guide 26, respectively.

The wire attachment part 52 basically includes a wire attachment structure 58 and a guide structure 60. The wire attachment part 52, overall, has a substantially C-shaped configuration as viewed along the first and second inner link axes A and C, as best seen in FIGS. 4 and 5. The wire attachment structure 58 is arranged at one end of the wire attachment part 52, while the guide structure 60 is arranged at an opposite end of the wire attachment part 52. The wire attachment structure 58 and the guide structure 60 are arranged on opposite sides of and substantially equally spaced from a first link plane L containing the first inner and outer link axes A and C. The first link plane L also corresponds to a longitudinal axis of the first link 22 (i.e. a longitudinal axis of the linkage part 50). The wire attachment structure 58 is preferably spaced further from the first link plane L than the distance between the first inner and outer link axes A and B. The wire attachment structure 58 (e.g. an inner wire attachment point) is disposed on a first side of the longitudinal axis (i.e. the first link plane L) of the inner link 22 that is closer to the chain guide 26.

The wire attachment structure 58 is basically conventional except for its location/orientation relative to the other parts of the front derailleur 12, as discussed and illustrated herein. Thus, the wire attachment structure 58 basically includes a bolt support portion 58a with a mounting surface and a threaded hole (not shown) extending therefrom, and a wire attachment bolt 58b that is threadedly mounted in the threaded hole in order to fixedly attach the shift control cable 16 (i.e. the inner wire of the shift control cable 16) thereto by clamping the control cable between the mounting surface of the bolt support portion 58a and the head of the wire attachment bolt 58b in a conventional manner by tightening the bolt 58b. In this embodiment, the wire attachment bolt is mounted with its center axis non-parallel (e.g. perpendicular to) the link axes A, B, C and D. Of course, optionally, an additional attachment plate can be used in the wire attachment structure 58 in a conventional manner if needed and/or desired. The wire attachment structure 58 is configured and arranged to guide the shift control cable 16 upwardly when the front derailleur 12 is used in a top pull arrangement, or to guide the shift control cable 16 to the guide structure 60 when the front derailleur is used in a bottom pull arrangement.

The guide structure 60 basically includes a curved guide surface (bottom pull wire guiding surface) 62 as well as a pair of retaining protrusions 64 and 66 arranged on opposite sides of the guide surface 62. Preferably, the curved guide surface 62 includes a small recess or groove (not shown) configured to partially receive the shift control cable 16 therein. The curved guide surface 62 is preferably configured and arranged to guide the shift control cable 16 (i.e. the inner wire of the shift control cable 16) downwardly at a location substantially aligned with the longitudinal center plane P, as seen in FIGS. 4 and 5. The curved bottom pull wire guide surface 62 is disposed on a second side of the longitudinal axis (i.e. the first link plane L) of the inner link 22 that is remote from the chain guide 26.

Referring still to FIGS. 1-5, the outer link 24 basically includes a first end 70 and a second end 72. The first and second ends 70 and 72 are preferably integrally formed together as a one-piece, unitary member. In any case, the first and second ends 70 and 72 rigidly coupled together, and are preferably constructed of a lightweight, rigid material such as aluminum alloy or any other material that is well known in the art. The first end 70 is pivotally coupled to the base member 20 between the front and rear mounting flanges 40 and 42 for rotation about the first outer link axis B. The second end 72 is pivotally coupled to the chain guide 26 for rotation about a second outer link axis D that is parallel to the first outer link axis B.

Figure 3:
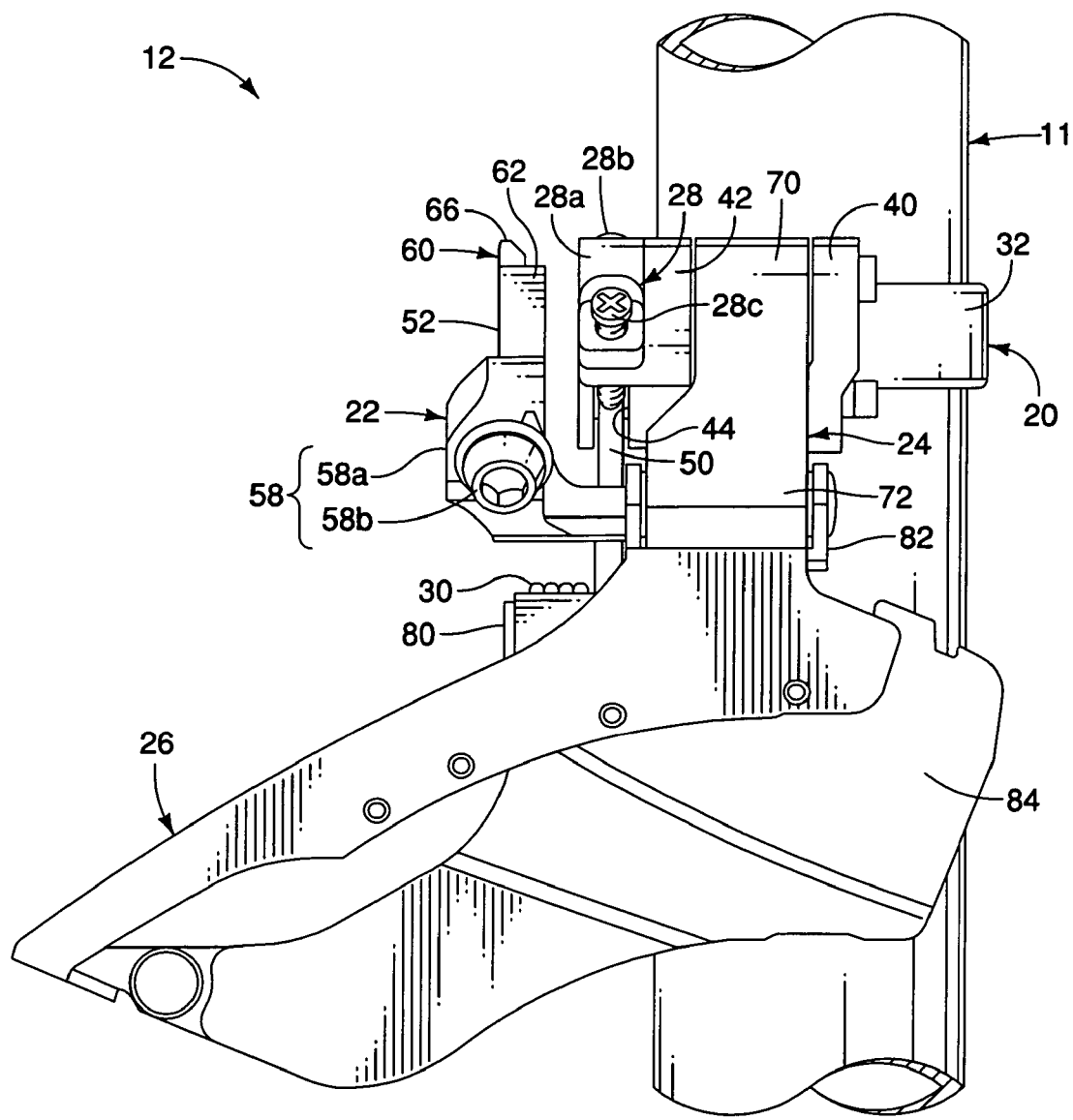
FIG. 3 is an outboard side elevational view of the top/bottom pull front derailleur illustrated in FIGS. 1 and 2 in accordance with the first embodiment of the present invention.

The first end 70 has a first width as measured along the first outer link axis B, and the second end 72 has a second width as measured along the second outer link axis D that is larger than the first width. The front end surfaces of the first and second ends 70 and 72 are preferably parallel as viewed from a direction perpendicular to the center plane P (FIG. 3). Thus, the rear end surface of the second end 72 is preferably located rearwardly of the rear end surface of the first end 70 to form a recessed area located rearwardly of the first end 70 of the outer link 24. Due to this arrangement, the rearward end surface (e.g. a rearward portion) of the second end 72 is substantially vertically aligned with the rear mounting flange 42 of the base member 22 as viewed along a direction perpendicular to the longitudinal center plane P of the bicycle frame 11.

The chain guide 26 basically includes an inner attachment portion 80, an outer attachment portion 82 and a chain cage 84. The chain cage 84 is pivotally attached or coupled to the inner and outer links 22 and 24 via the inner and outer attachment portions 80 and 82, respectively. In particular, the inner and outer attachment portions 80 and 82 are formed with apertures (only partially shown) that receive generally parallel second inner and outer pivot pins to pivotally support the inner and outer links 22 and 24 in a conventional manner. More specifically, the inner and outer attachment portions 80 and 82 each include a pair of flanges with apertures formed therein for pivotally coupling the inner and outer links 22 and 24 therebetween. The biasing member 30 is disposed at the connection point (e.g. on the second inner pivot pin about the second inner link axis C) between the inner link 22 and the inner attachment portion 80 in a conventional manner. The inner attachment portion 80, the outer attachment portion 82 and the chain cage 84 are non-movably fixedly coupled together to move together as a unit. The parts of the chain guide 26 are preferably constructed of a lightweight, rigid material such as aluminum alloy or any other material that is well known in the art. Of course, it will be apparent to those skilled in the art from this disclosure that various constructions of the chain guide 26, such as sheet material, cast material, etc., are possible without departing from the scope of the present invention. Moreover, it will be apparent to those skilled in the art from this disclosure that the parts of the chain guide 26 can be constructed of one or more pieces as needed and/or desired.

SECOND EMBODIMENT

Figure 6:
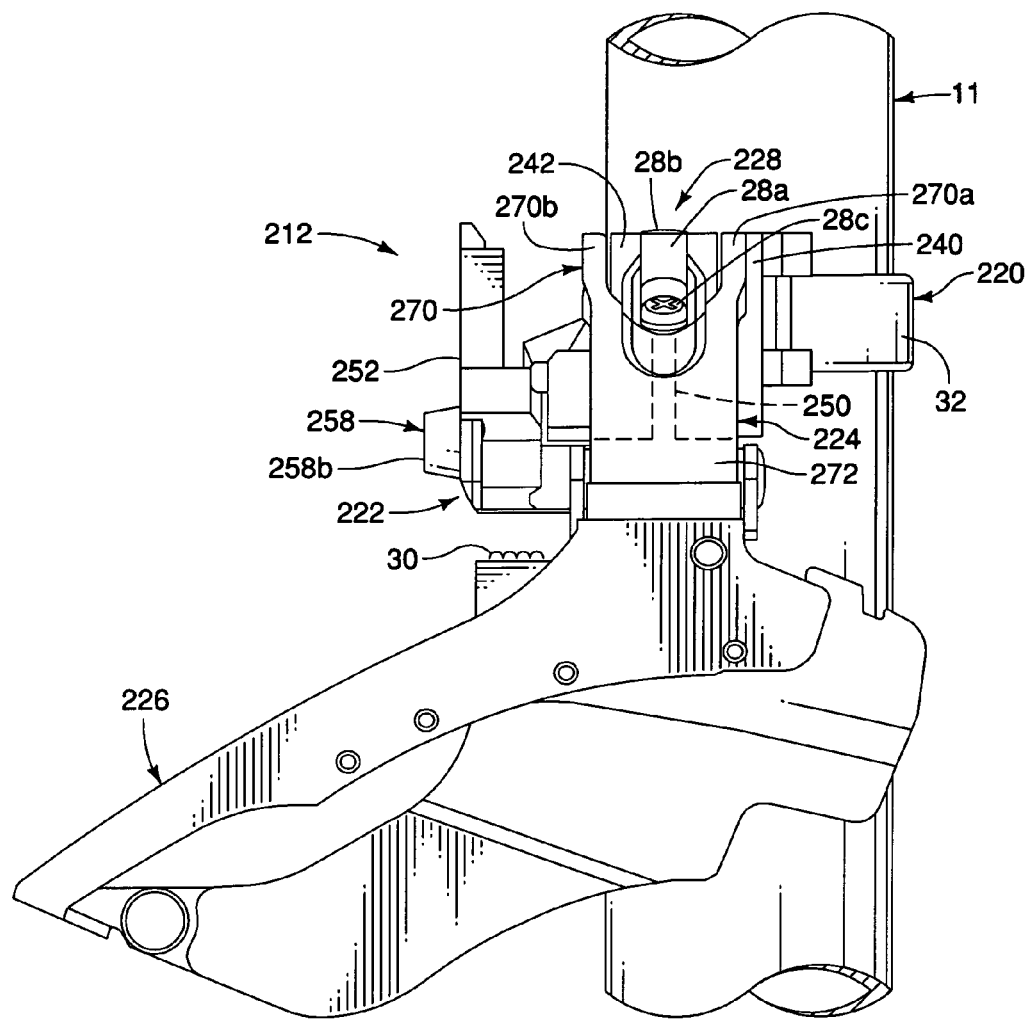
FIG. 6 is an outboard side elevational view of a top/bottom pull front derailleur in accordance with a second embodiment of the present invention.
Figure 7:
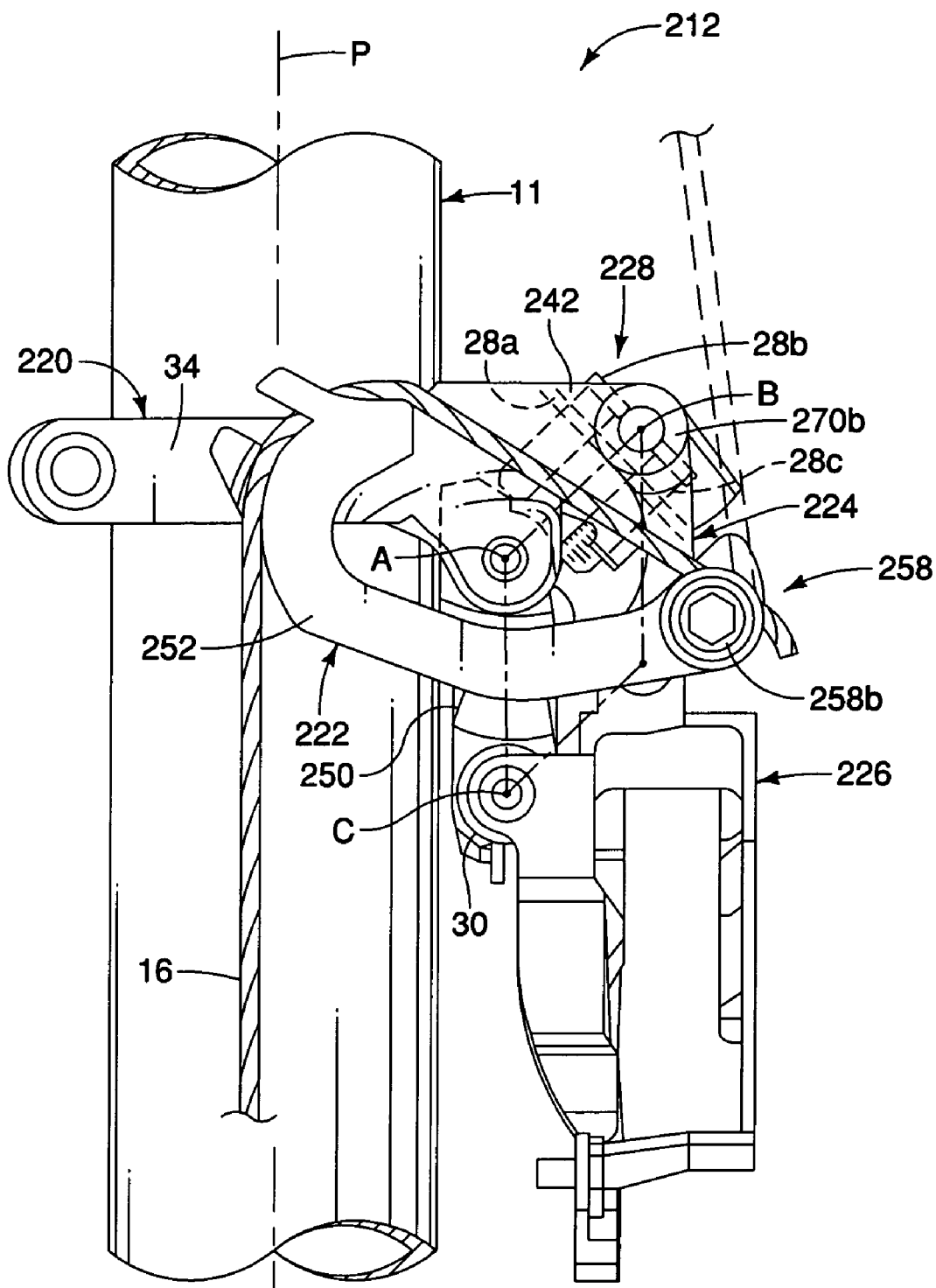
FIG. 7 is a rear side elevational view of the top/bottom pull front derailleur illustrated in FIG. 6 with the chain guide in a low (retracted) shift position in accordance with the second embodiment of the present invention.
Figure 8:
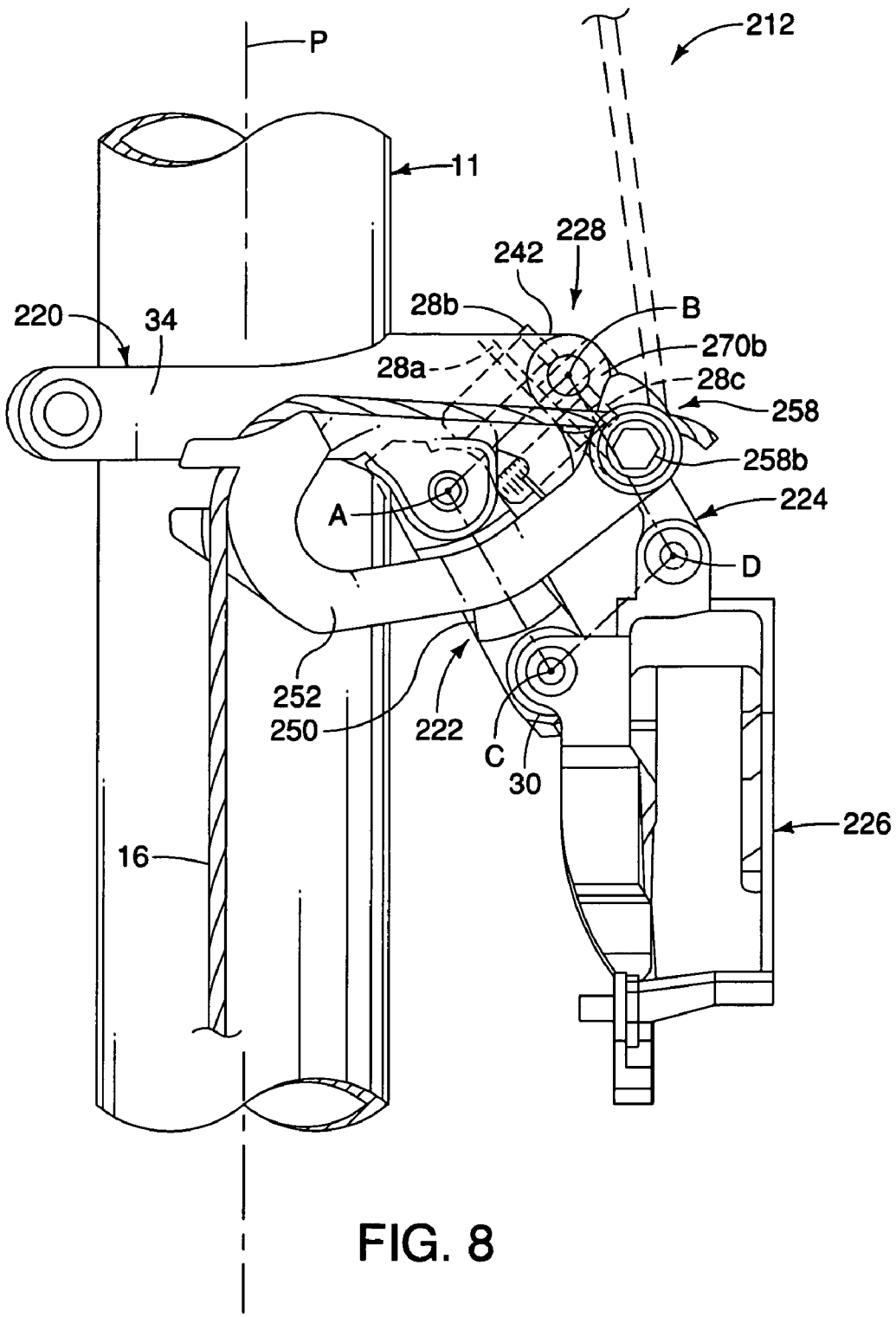
FIG. 8 is a rear side elevational view of the top/bottom pull front derailleur illustrated in FIGS. 6 and 7 with the chain guide in a top (extended) shift position in accordance with the second embodiment of the present invention.

Referring now to FIGS. 6-8, a modified front derailleur 212 in accordance with a second embodiment of the present invention will now be explained. The front derailleur 212 is basically identical to the front derailleur 12 of the first embodiment, except that a modified low/top adjustment mechanism 228 is used that has been moved forwardly from the position of the low /top adjustment mechanism 28 of the first embodiment. Also, various parts of the front derailleur 212 have been modified in order to accommodate this modified adjustment mechanism 228 as explained below. In view of the similarity between the first and second embodiments, the parts of the second embodiment that are identical to parts of the first embodiment will be given the same reference numerals as the parts of the first embodiment. Thus, the descriptions of the parts of the second embodiment that are identical to the parts of the first embodiment may be omitted for the sake of brevity. Moreover, in view of the similarity between the first and second embodiments, the parts of the second embodiment that are functionally identical to parts of the first embodiment will be given the same reference numerals as the parts of the first embodiment but with "200" added thereto (i.e. 200 series reference numerals). It will be apparent to those skilled in the art from this disclosure that the descriptions and illustrations of the first embodiment also apply to this second embodiment, except as explained and illustrated herein.

The front derailleur 212 of this second embodiment basically includes a modified base member 220, a modified inner link 222, a modified outer link 224, a modified chain guide 226, the modified low/top adjustment mechanism 228 and the biasing member 30.

The base member 220 is identical to the base member 20 except that the front and rear mounting flanges 40 and 42 of the first embodiment have been replaced with modified front and rear mounting flanges 240 and 242. The front mounting flange 240 is smaller (narrower) than the mounting flange 40 of the first embodiment, while the rear mounting flange 242 is a similar width to the flange 42 of the first embodiment. However, the rear mounting flange 242 has been moved forward in this embodiment. The rear mounting flange 242 has been further modified such that the adjustment mechanism 228 is substantially centrally mounted therein (relative to the forward/rearward direction). The base member 220 also has a modified inner link receiving recess (not shown) that is aligned with the adjustment mechanism 228.

The inner link 222 is identical to the inner link 22, except that the inner link 222 has a modified linkage part 250 and a modified wire attachment part 252 non-movably fixed to the linkage part 250 to move therewith. The linkage part 250 is identical to the linkage part 50, except that the linkage part 250 is located forwardly of the linkage part 50 such that it selectively contacts the adjustment mechanism 228 in its modified position. The wire attachment part 252 is identical to the wire attachment part 50, except that the wire attachment part 252 has a slightly different shape and a modified wire attachment structure 258 that uses a wire fixing bolt 258b with its axis parallel to the link (pivot) axes A, B, C, and D.

The inner link 222 is pivotally coupled to the chain guide 226 in a manner identical or substantially identical to the first embodiment. In particular, the chain guide 226 may be modified slightly in order to accommodate the positioning of the linkage part 250, or the inner link 222 may be further modified such that the lower end of the linkage part 250 is identical to the second end 56 of the first embodiment (e.g. such that the chain guide 226 is identical to the chain guide 26).

The outer link 224 is identical to the outer link 24, except that the outer link 224 has a substantially Y-shaped configuration. Specifically, the outer link 224 includes a first end 270 that is split into a first attachment portion 270a and a second attachment portion 270b with the top/low adjustment mechanism 228 being disposed between the first and second attachment portions 270a and 270b. The first attachment portion 270a is pivotally mounted between the front and rear attachment flanges 240 and 242, while the second attachment portion 270b is located rearwardly of the rear attachment flange 242. The outer link 224 is pivotally coupled to the chain guide 226 in a manner identical to the first embodiment.

The low/top adjustment mechanism 228 includes the mounting plate 28a and the low and top position adjusting bolts 28b and 28c of the first embodiment. In other words, the adjustment mechanism 228 is identical to the adjustment mechanism 28 of the first embodiment, except for its location.

Of course, it will be apparent to those skilled in the art from this disclosure that various other minor modifications have been made in this second embodiment to accommodate the position of the adjustment mechanism 228. In other words, only the substantial changes in this second embodiment as compared to the first embodiment have been discussed and/or illustrated in detail herein for the sake of brevity. However, it will be apparent to those skilled in the art from this disclosure how to make and use the derailleur 212 of this second embodiment from the discussion herein and the discussion of the first embodiment.

THIRD EMBODIMENT

Figure 9:
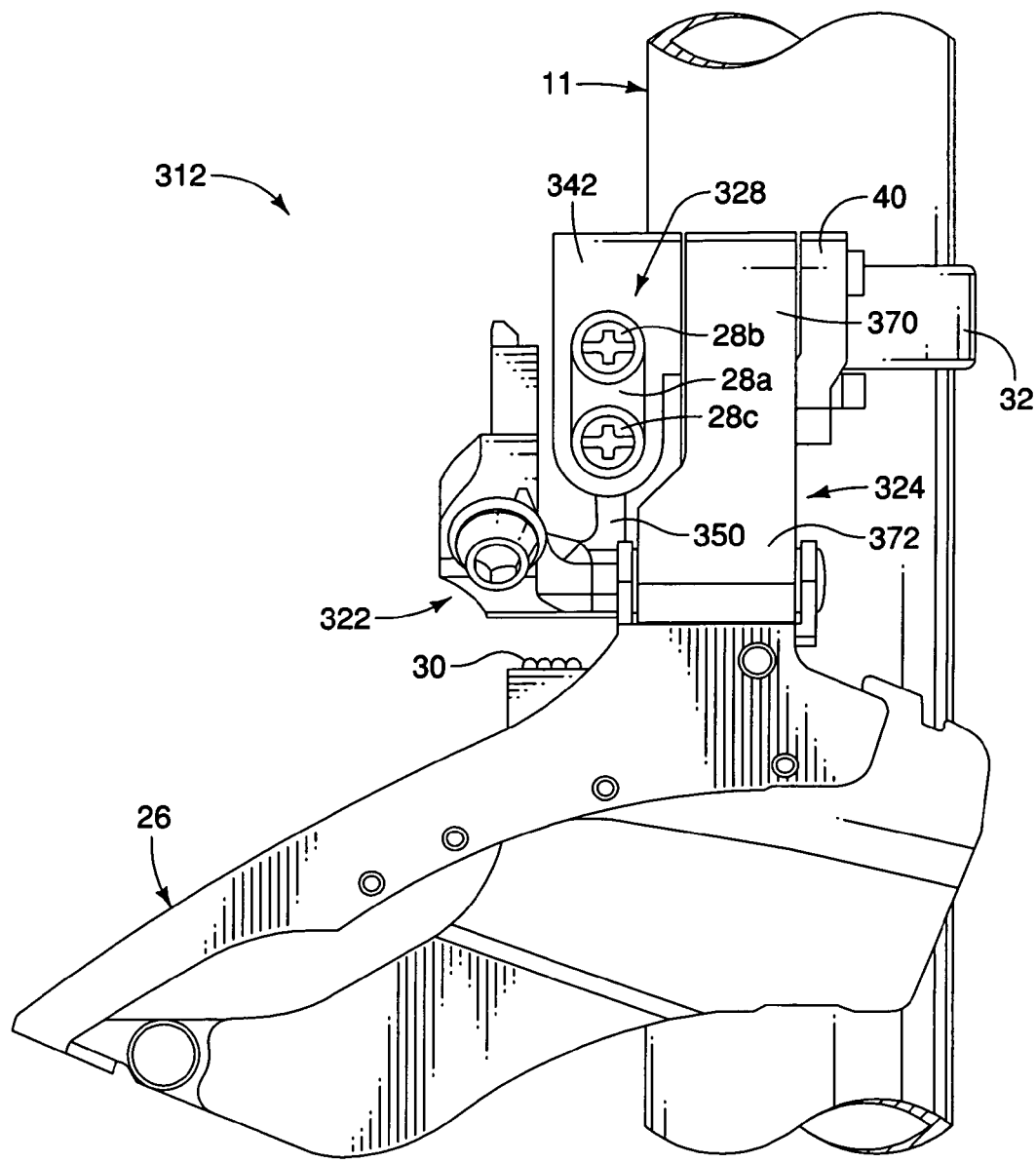
FIG. 9 is an outboard side elevational view of the top/bottom pull front derailleur in accordance with a third embodiment of the present invention.
Figure 10:
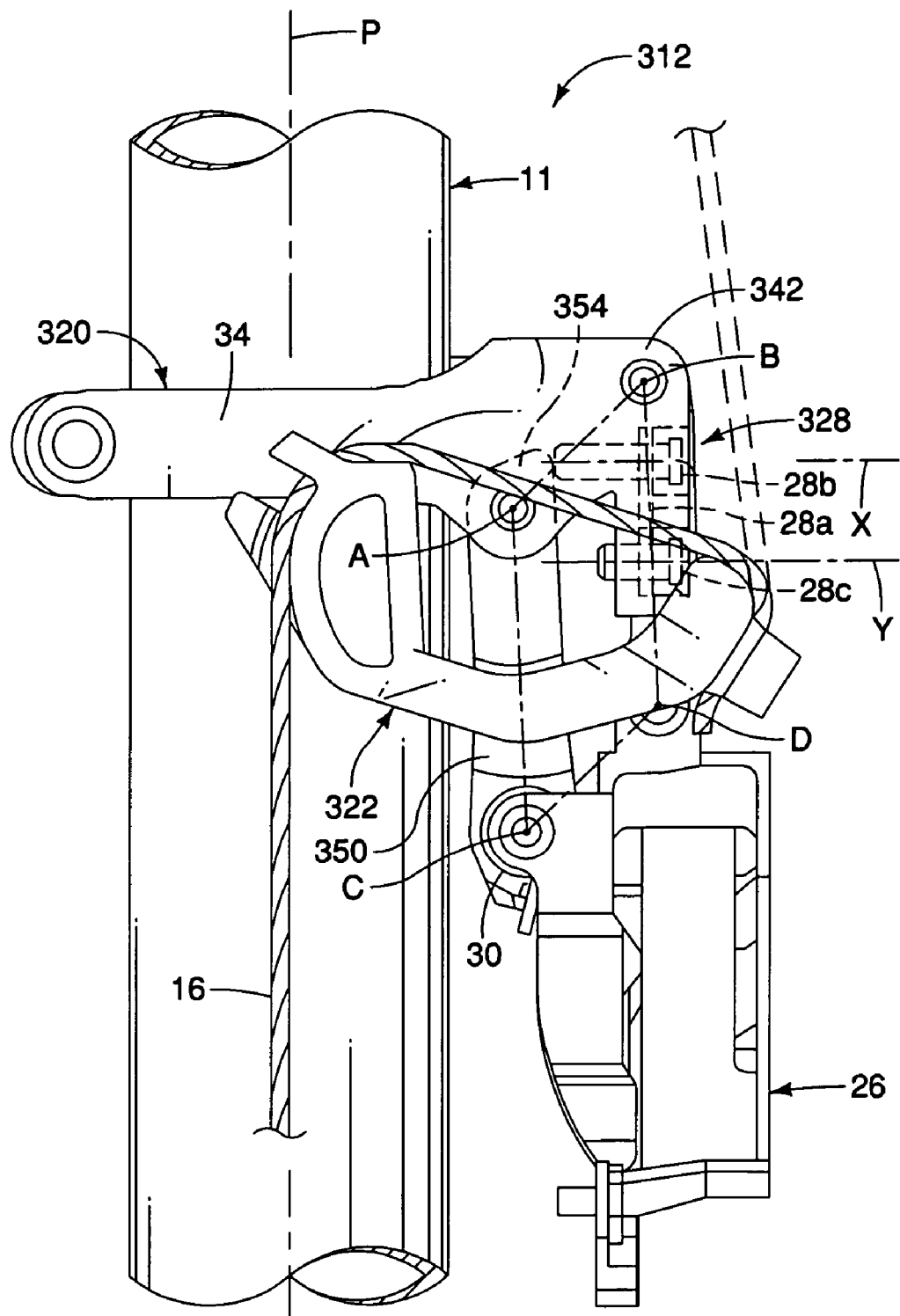
FIG. 10 is a rear side elevational view of the top/bottom pull front derailleur illustrated in FIG. 9 with the chain guide in a low (retracted) shift position in accordance with the third embodiment of the present invention.
Figure 11:
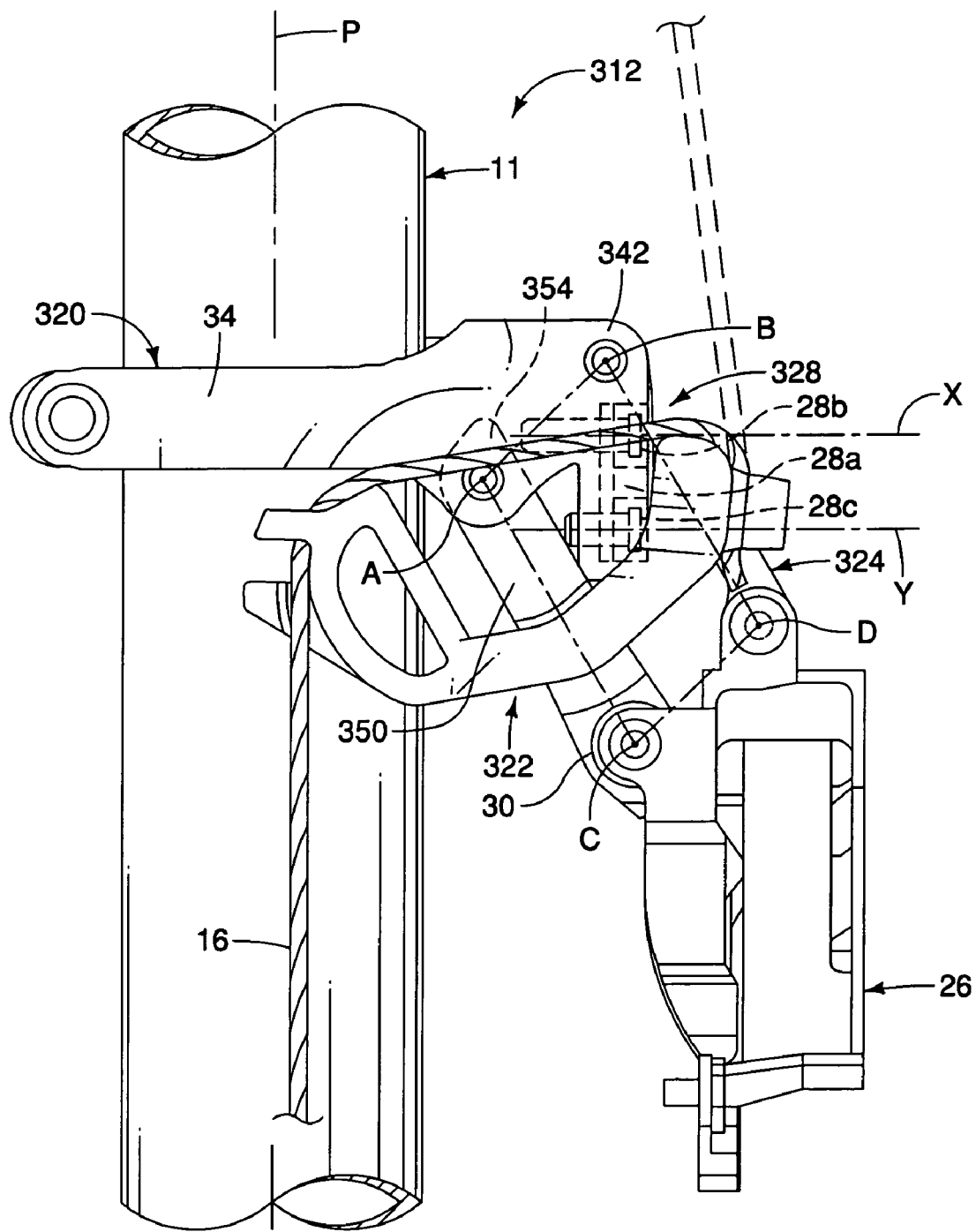
FIG. 11 is a rear side elevational view of the top/bottom pull front derailleur illustrated in FIGS. 9 and 10 with the chain guide in a top (extended) shift position in accordance with the third embodiment of the present invention.

Referring now to FIGS. 9-11, a modified front derailleur 312 in accordance with a third embodiment of the present invention will now be explained. The front derailleur 312 is basically identical to the front derailleur 12 of the first embodiment, except that a modified low/top adjustment mechanism 328 is used that has been angled about ninety degrees relative to the longitudinal center plane P of the frame 11 rather than about forty-five degrees as in the first embodiment. Also, various parts of the front derailleur 312 have been modified in order to accommodate this modified low/top adjustment mechanism 328 as explained below. In view of the similarity between the first and third embodiments, the parts of the third embodiment that are identical to parts of the first embodiment will be given the same reference numerals as the parts of the first embodiment. Thus, the descriptions of the parts of the third embodiment that are identical to the parts of the first embodiment may be omitted for the sake of brevity. Moreover, in view of the similarity between the first and third embodiments, the parts of the third embodiment that are functionally identical to parts of the first embodiment will be given the same reference numerals as the parts of the first embodiment but with "300" added thereto (i.e. 300 series reference numerals). It will be apparent to those skilled in the art from this disclosure that the descriptions and illustrations of the first embodiment also apply to this third embodiment, except as explained and illustrated herein.

The front derailleur 312 of this third embodiment basically includes a modified base member 320, a modified inner link 322, a modified outer link 324, the chain guide 26, the modified low/top adjustment mechanism 328 and the biasing member 30.

The base member 320 is identical to the base member 20 except that a modified rear mounting flange 342 is provided in place of the rear attachment flange 42 of the first embodiment. The rear mounting flange 342 is identical to the mounting flange 42 of the first embodiment, except that the rear mounting flange 342 is configured and arranged to mount the low and top adjusting bolts 28b and 28c such that their longitudinal bolt axes X and Y are angled about ninety degrees relative to the longitudinal center plane P of the frame 11.

The inner link 322 is identical to the inner link 22, except that the inner link 322 has a modified linkage part 350 with a modified first end 354 that is configured and arranged to selectively contact the low and top adjusting bolts 28b and 28c in their ninety degree orientation. The inner link 322 is pivotally coupled to the chain guide 26 in a manner identical to the first embodiment.

The outer link 324 is identical to the outer link 24, except that the outer link 324 has a slightly modified shape to accommodate the modified low/top adjustment mechanism 328. Specifically, the outer link 324 includes a first end 370 that is longer than the first end 70 of the first embodiment, and a second end 372 that is shorter than the second end 72 of the first embodiment. This arrangement is provided to accommodate the modified low/top adjustment mechanism 328. The outer link 324 is pivotally coupled to the base member 320 and the chain guide 26 in a manner identical to the first embodiment.

The low/top adjustment mechanism 328 includes the mounting plate 28a and the low and top position adjusting bolts 28b and 28c of the first embodiment. In other words, the adjustment mechanism 328 is identical to the adjustment mechanism 28 of the first embodiment, except for its location/orientation. Due to the location/orientation of the adjustment mechanism 328, the low and top longitudinal bolt axes X and Y are disposed on the same side of the first outer link axis B in this embodiment. Moreover, low and top longitudinal bolt axes X and Y are preferably disposed between the first and second outer link axes B and D.

Of course, it will be apparent to those skilled in the art from this disclosure that various other minor modifications have been made in this third embodiment to accommodate the position of the adjustment mechanism 328. In other words, only the substantial changes in this third embodiment as compared to the first embodiment have been discussed and/or illustrated in detail herein for the sake of brevity. However, it will be apparent to those skilled in the art from this disclosure how to make and use the derailleur 312 of this third embodiment from the discussion herein and the discussion of the first embodiment.

FOURTH EMBODIMENT

Figure 12:
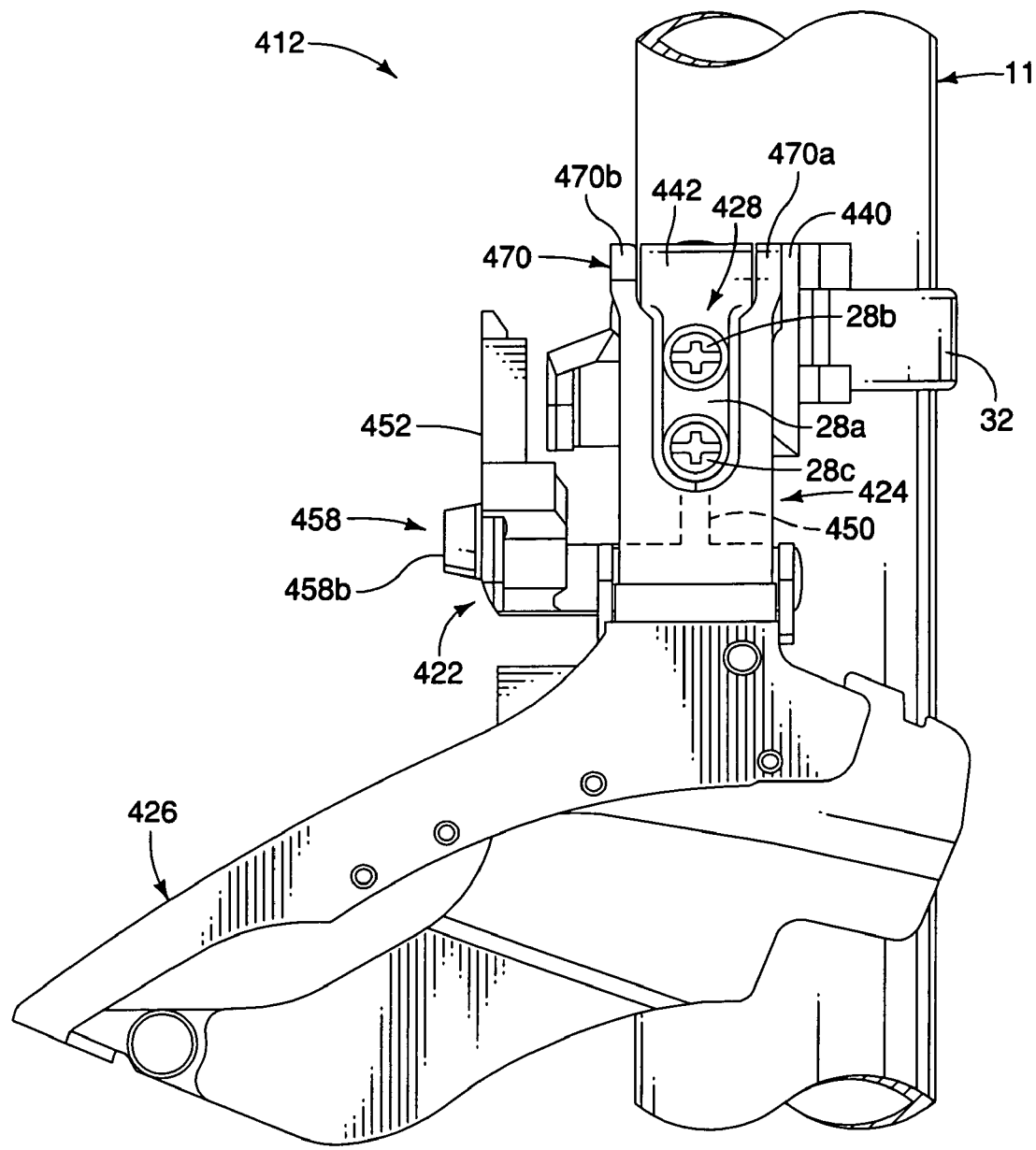
FIG. 12 is an outboard side elevational view of the top/bottom pull front derailleur in accordance with a fourth embodiment of the present invention.
Figure 13:
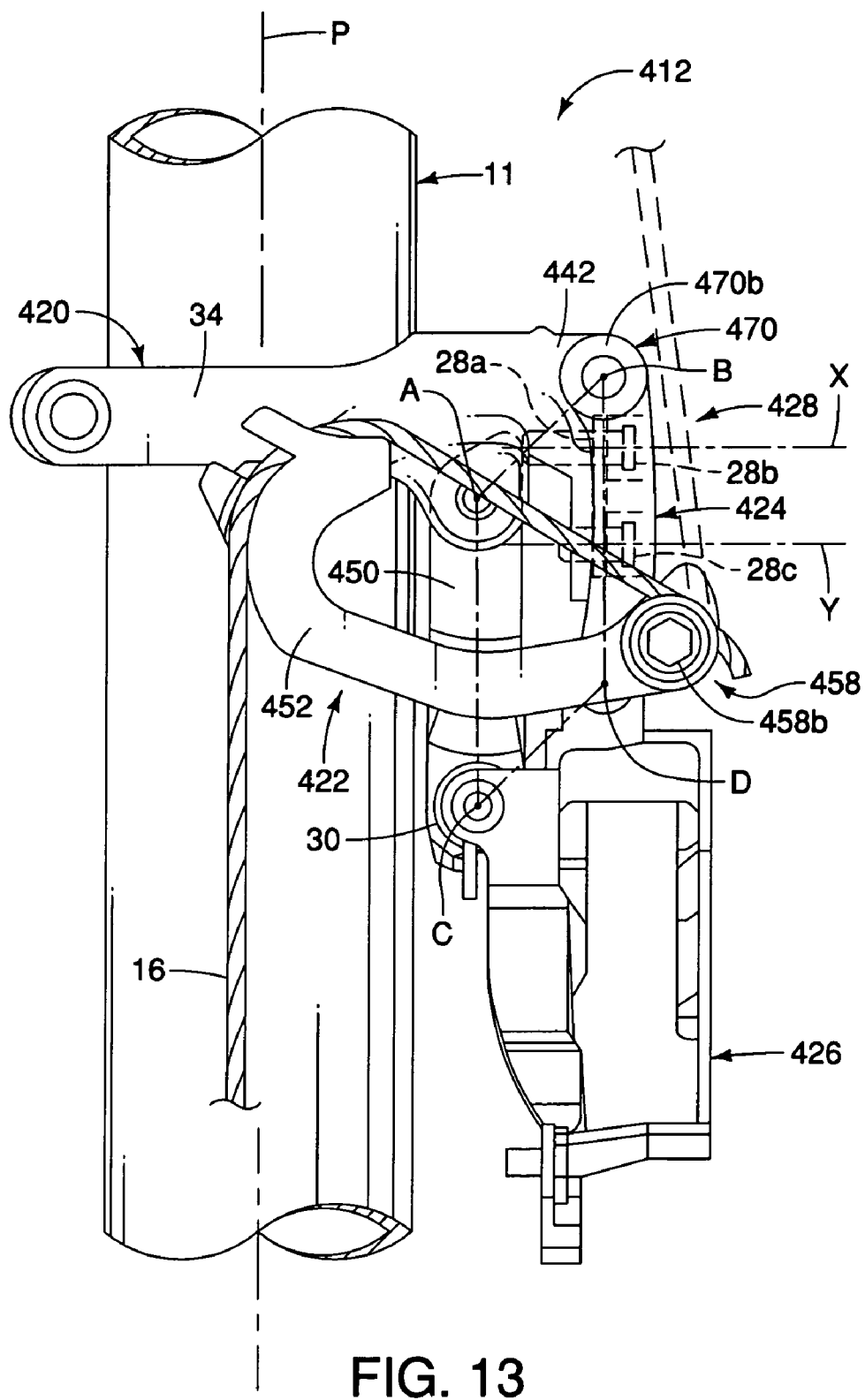
FIG. 13 is a rear side elevational view of the top/bottom pull front derailleur illustrated in FIG. 12 with the chain guide in a low (retracted) shift position in accordance with the fourth embodiment of the present invention.
Figure 14:
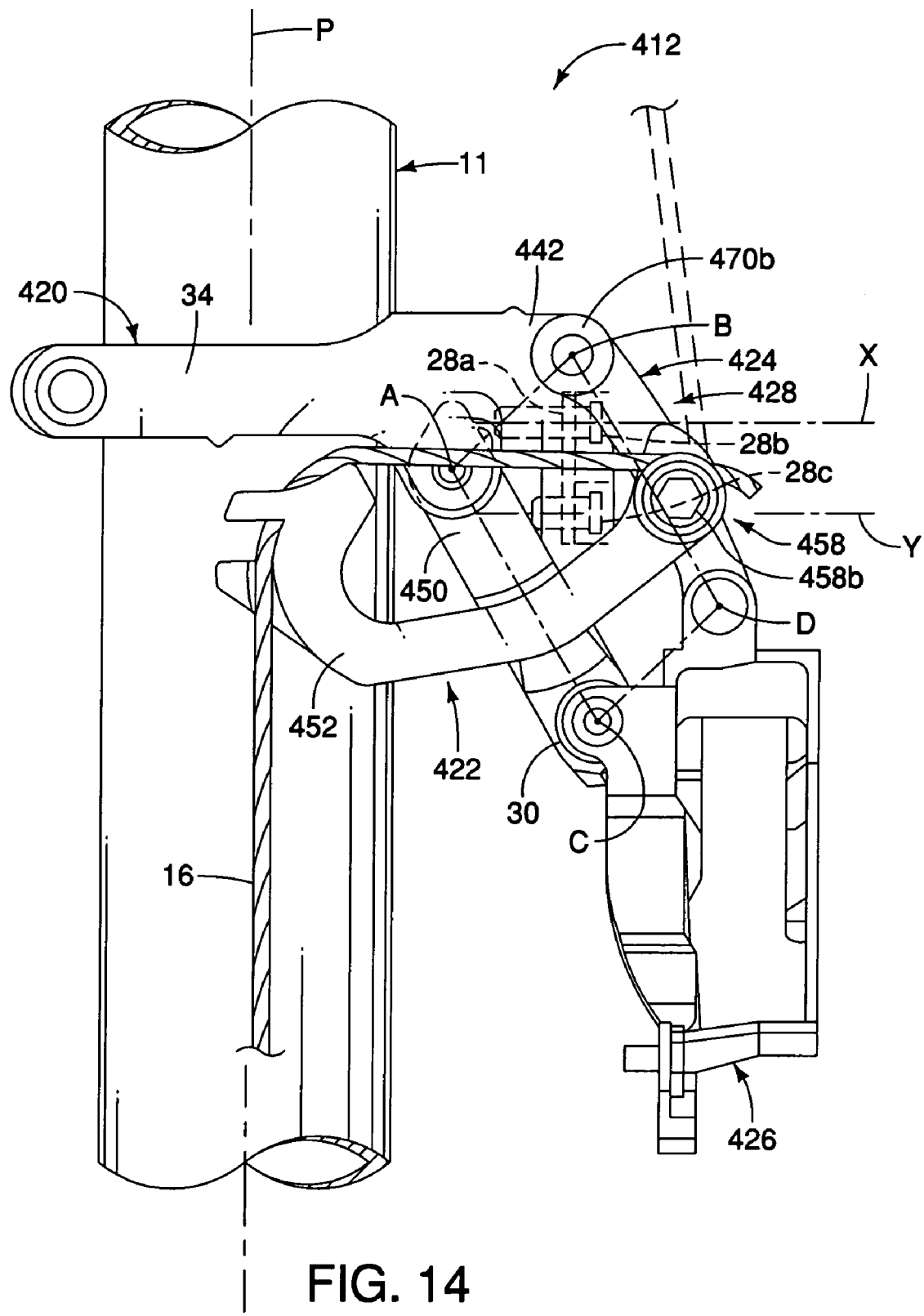
FIG. 14 is a rear side elevational view of the top/bottom pull front derailleur illustrated in FIGS. 12 and 13 with the chain guide in a top (extended) shift position in accordance with the fourth embodiment of the present invention.

Referring now to FIGS. 12-14, a modified front derailleur 412 in accordance with a fourth embodiment of the present invention will now be explained. The front derailleur 412 is basically identical to the front derailleur 312 of the third embodiment, except that a modified low/top adjustment mechanism 428 is used that has been moved forwardly from the position of the low/top adjustment mechanism 328 of the third embodiment. Also, various parts of the front derailleur 412 have been modified in order to accommodate this modified adjustment mechanism 428 as explained below. In view of the similarity between the third and fourth embodiments, the parts of the fourth embodiment that are identical to parts of the third embodiment will be given the same reference numerals as the parts of the third embodiment. Thus, the descriptions of the parts of the fourth embodiment that are identical to the parts of the third embodiment may be omitted for the sake of brevity. Moreover, in view of the similarity between the third and fourth embodiments, the parts of the fourth embodiment that are functionally identical to parts of the third embodiment will be given the same reference numerals as the parts of the third embodiment but with "100" added thereto (i.e. 400 series reference numerals). It will be apparent to those skilled in the art from this disclosure that the descriptions and illustrations of the third embodiment also apply to this fourth embodiment, except as explained and illustrated herein.

The front derailleur 412 of this fourth embodiment basically includes a modified base member 420, a modified inner link 422, a modified outer link 424, a modified chain guide 426, the modified low/top adjustment mechanism 428 and the biasing member 30.

The base member 420 is identical to the base member 320 except that the front and rear mounting flanges 40 and 342 of the third embodiment have been replaced with modified front and rear mounting flanges 440 and 442. The front mounting flange 440 is smaller (narrower) than the mounting flange 40, while the rear mounting flange 442 is a similar width to the flange 342 of the third embodiment. However, the rear mounting flange 442 has been moved forward in this embodiment. The rear mounting flange 442 has been further modified such that the adjustment mechanism 428 is substantially centrally mounted therein (relative to the forward/rearward direction). The base member 420 also has a modified inner link receiving recess (not shown) that is aligned with the adjustment mechanism 428.

The inner link 422 is identical to the inner link 322, except that the inner link 422 has a modified linkage part 450 and a modified wire attachment part 452 non-movably fixed to the linkage part 450 to move therewith. The linkage part 450 is identical to the linkage part 350, except that the linkage part 450 is located forwardly of the linkage part 350 such that it selectively contacts the adjustment mechanism 428 in its modified position. The wire attachment part 452 is identical to the wire attachment part 352, except that the wire attachment part 452 has a slightly different shape and a modified wire attachment structure 458 that uses a wire fixing bolt 458b with its axis parallel to the link (pivot) axes A, B, C, and D (in a manner similar to the second embodiment).

The inner link 422 is pivotally coupled to the chain guide 426 in a manner identical or substantially identical to the third embodiment. In particular, the chain guide 426 may be modified slightly in order to accommodate the positioning of the linkage part 450, or the inner link 422 may be further modified such that the lower end of the linkage part 450 is identical to the second end 56 of the first embodiment (e.g. such that the chain guide 426 is identical to the chain guide 26).

The outer link 424 is identical to the outer link 324, except that the outer link 424 has a substantially Y-shaped configuration. Specifically, the outer link 424 includes a first end 470 that is split into a first attachment portion 470a and a second attachment portion 470b with the top/low adjustment mechanism 428 being disposed between the first and second attachment portions 470a and 470b. The first attachment portion 470a is pivotally mounted between the front and rear attachment flanges 440 and 442, while the second attachment portion 470b is located rearwardly of the rear attachment flange 442. The outer link 424 is pivotally coupled to the chain guide 426 in a manner identical to the third embodiment.

The low/top adjustment mechanism 428 includes the mounting plate 28a and the low and top position adjusting bolts 28b and 28c of the first/third embodiments. In other words, the adjustment mechanism 428 is identical to the adjustment mechanism 328 of the third embodiment, except for its location.

Of course, it will be apparent to those skilled in the art from this disclosure that various other minor modifications have been made in this fourth embodiment to accommodate the position of the adjustment mechanism 428. In other words, only the substantial changes in this fourth embodiment as compared to the third embodiment have been discussed and/or illustrated in detail herein for the sake of brevity. However, it will be apparent to those skilled in the art from this disclosure how to make and use the derailleur 412 of this fourth embodiment from the discussion herein, the discussion of the third embodiment, and the discussion of the first embodiment.

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A top/bottom pull bicycle front derailleur comprising:
a base member configured to be coupled to a portion of a bicycle frame, the base member including a front mounting flange and a rear mounting flange;
an inner link having a first end, a second end and an inner wire fixing part, the first end being pivotally coupled to the base member about a first inner link axis, and the inner wire fixing part being configured and arranged to guide an inner wire to be selectively guided in one of a top pull arrangement and a bottom pull arrangement;
an outer link having a first end and a second end with the first end of the outer link being pivotally coupled to the base member between the front and rear mounting flanges to pivot about a first outer link axis;
a chain guide pivotally coupled to the second end of the inner link about a second inner link axis and pivotally coupled to the second end of the outer link about a second outer link axis such that the chain guide is configured to move between a retracted position and an extended position relative to the base member; and
a top/low adjustment mechanism coupled to the base member, the top/low adjustment mechanism including
a top position adjusting bolt with a top longitudinal bolt axis arranged at an angle greater than zero degrees with respect to a longitudinal center plane of the bicycle frame and configured to selectively contact the inner link to selectively adjust the extended position of the chain guide with respect to the base member, and
a low position adjusting bolt with a low longitudinal bolt axis arranged at an angle greater than zero degrees with respect to the longitudinal center plane of the bicycle frame and configured to selectively contact the inner link to selectively adjust the retracted position of the chain guide with respect to the base member,
the rear mounting flange having the top and low position adjusting bolts of the top/low adjustment mechanism coupled thereto such that the top and low adjusting bolts are spaced longitudinally rearwardly from the first end of the outer link.

2. The top/bottom pull bicycle front derailleur as set forth in claim 1, wherein
the first end of the outer link is split into a first attachment portion and a second attachment portion with the top/low adjustment mechanism being disposed between the first and second attachment portions of the first end of the outer link.

3. The top/bottom pull bicycle front derailleur as set forth in claim 2, wherein
the top and low longitudinal bolt axes are angled approximately 45 degrees relative to the plane of the bicycle frame.

4. The top/bottom pull bicycle front derailleur as set forth in claim 2, wherein
the top and low longitudinal bolt axes are angled approximately 90 degrees relative to the plane of the bicycle frame.

5. The top/bottom pull bicycle front derailleur as set forth in claim 1, wherein
the first end of the outer link has a first width as measured along the first outer link axis, and
the second end of the outer link has a second width as measured along the second outer link axis that is larger than the first width.

6. The top/bottom pull bicycle front derailleur as set forth in claim 5, wherein
the second end of the outer link extends in a rearward direction of the top/bottom pull bicycle front derailleur such that a rearward portion of the second end of the outer link is substantially vertically aligned with the rear mounting flange of the base member as viewed along a direction perpendicular to the plane of the bicycle frame.

7. The top/bottom pull bicycle front derailleur as set forth in claim 1, wherein
the top and low longitudinal bolt axes are angled approximately 45 degrees relative to the plane of the bicycle frame.

8. The top/bottom pull bicycle front derailleur as set forth in claim 1, wherein
the top and low longitudinal bolt axes are angled approximately 90 degrees relative to the plane of the bicycle frame.

9. A top/bottom pull bicycle front derailleur comprising:
a base member configured to be coupled to a portion of a bicycle frame;
an inner link having a first end, a second end and an inner wire fixing part, the first end being pivotally coupled to the base member about a first inner link axis, and the inner wire fixing part being configured and arranged to guide an inner wire to be selectively guided in one of a top pull arrangement and a bottom pull arrangement;
an outer link having a first end and a second end with the first end of the outer link being pivotally coupled to the base member about a first outer link axis;
a chain guide pivotally coupled to the second end of the inner link about a second inner link axis and pivotally coupled to the second end of the outer link about a second outer link axis such that the chain guide is configured to move between a retracted position and an extended position relative to the base member; and
a top/low adjustment mechanism coupled to the base member, the top/low adjustment mechanism including
a top position adjusting bolt with a top longitudinal bolt axis arranged at an angle greater than zero degrees with respect to a longitudinal center plane of the bicycle frame and configured to selectively contact the inner link to selectively adjust the extended position of the chain guide with respect to the base member, and
a low position adjusting bolt with a low longitudinal bolt axis arranged at an angle greater than zero degrees with respect to the longitudinal center plane of the bicycle frame and configured to selectively contact the inner link to selectively adjust the retracted position of the chain guide with respect to the base member,
the inner wire fixing part including an inner wire attachment point disposed on a first side of a longitudinal axis of the inner link that is further from the longitudinal center plane than a bottom pull wire guiding surface disposed on a second opposite side of the longitudinal axis of the inner link that is closer to the longitudinal center plane than the first side, the longitudinal axis of the inner link connecting the first and second inner link axes, with the inner wire attachment point and the bottom pull wire guiding surface being fixedly attached to the inner link to move together with the inner link as a single unit.

10. A top/bottom pull bicycle front derailleur comprising:
a base member configured to be coupled to a portion of a bicycle frame;
an inner link having a first end, a second end and an inner wire fixing part, the first end being pivotally coupled to the base member about a first inner link axis, and the inner wire fixing part being configured and arranged to guide an inner wire to be selectively guided in one of a top pull arrangement and a bottom pull arrangement;
an outer link having a first end and a second end with the first end of the outer link being pivotally coupled to the base member about a first outer link axis, and the outer link being disposed further from a longitudinal center plane of the bicycle frame than the inner link;
a chain guide pivotally coupled to the second end of the inner link about a second inner link axis and pivotally coupled to the second end of the outer link about a second outer link axis such that the chain guide is configured to move between a retracted position and an extended position relative to the base member; and
a top/low adjustment mechanism coupled to the base member, the top/low adjustment mechanism including
a top position adjusting bolt with a top longitudinal bolt axis arranged at an angle greater than zero degrees with respect to the longitudinal center plane of the bicycle frame and configured to selectively contact the inner link to selectively adjust the extended position of the chain guide with respect to the base member, and
a low position adjusting bolt with a low longitudinal bolt axis arranged at an angle greater than zero degrees with respect to the longitudinal center plane of the bicycle frame and configured to selectively contact the inner link to selectively adjust the retracted position of the chain guide with respect to the base member,
the top and low longitudinal bolt axes being non-movable relative to the longitudinal center plane of the bicycle frame, and
the top longitudinal bolt axis being disposed on a first side of the first outer link axis and the low longitudinal bolt axis being disposed on a second opposite side of the first outer link axis, as viewed along the first outer link axis.

11. The top/bottom pull bicycle front derailleur as set forth in claim 10, wherein
the top and low longitudinal bolt axes are angled approximately 45 degrees relative to the plane of the bicycle frame.

12. The top/bottom pull bicycle front derailleur as set forth in claim 10, wherein
the first end of the outer link is split into a first attachment portion and a second attachment portion with the top/low adjustment mechanism being disposed between the first and second attachment portions of the first end of the outer link.

13. The top/bottom pull bicycle front derailleur as set forth in claim 1, wherein
the top and low longitudinal bolt axes are disposed on the same side of the first outer link axis.

14. The top/bottom pull bicycle front derailleur as set forth in claim 13, wherein
the top and low longitudinal bolt axes are disposed between the first and second outer link axes.

15. The top/bottom pull bicycle front derailleur as set forth in claim 13, wherein
the top and low longitudinal bolt axes are angled approximately 90 degrees relative to the plane of the bicycle frame.

16. The top/bottom pull bicycle front derailleur as set forth in claim 1, wherein
the top/low adjustment mechanism includes an anti-loosening structure coupled between the top and low position adjusting bolts and the base member.

17. The top/bottom pull bicycle front derailleur as set forth in claim 16, wherein
the anti-loosening structure includes a mounting plate that is a separate member from the base member.

18. The top/bottom pull bicycle front derailleur as set forth in claim 1, wherein the inner wire fixing part of the inner link is spaced longitudinally rearwardly from the top/low adjustment mechanism and the first end of the inner link such that the top/low adjustment mechanism and the first end of the inner link are disposed longitudinally between the first end of the outer link and the inner wire fixing part.

19. The top/bottom pull bicycle front derailleur as set forth in claim 9, wherein the bottom pull wire guiding surface is non-movably fixed relative to the inner wire attachment point.

20. The top/bottom pull bicycle front derailleur as set forth in claim 1, wherein the outer link is pivotally supported on the front and rear mounting flanges.

21. The top/bottom pull bicycle front derailleur as set forth in claim 9, wherein the first side of the longitudinal axis of the inner link is always disposed further from the longitudinal center plane than the bottom pull wire guiding surface, and the second opposite side of the longitudinal axis is closer to the longitudinal center plane than the first side when the longitudinal axis of the inner link is viewed along a plane parallel to the longitudinal center plane of the bicycle frame.

22. The top/bottom pull bicycle front derailleur as set forth in claim 10, wherein a plane passes through the outer axis and is parallel to the top and low longitudinal bolt axes, with the first and second sides of the first outer link axis being on opposite sides of the plane.

* * * * *